April 1, 1941.  A. SKAVINSKY  2,237,167
HYDRAULIC FLUID JACK FOR MOTOR VEHICLES
Filed Aug. 27, 1940   5 Sheets-Sheet 1
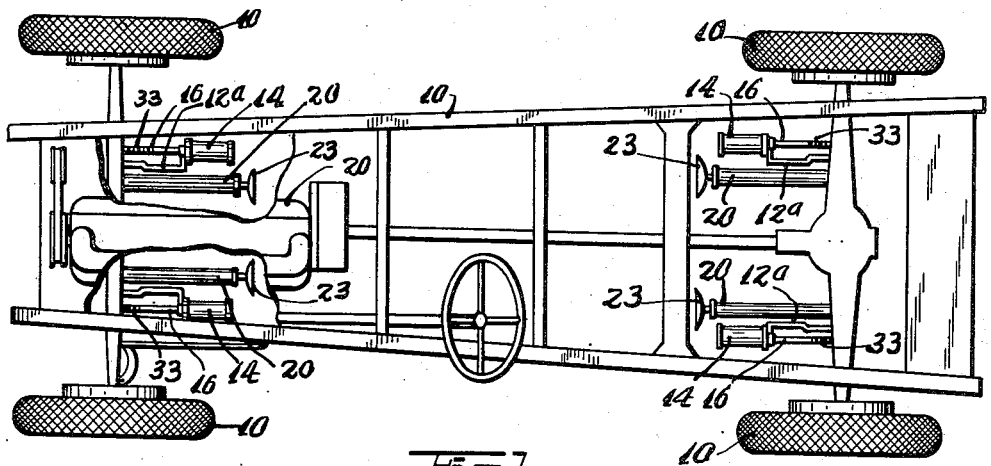
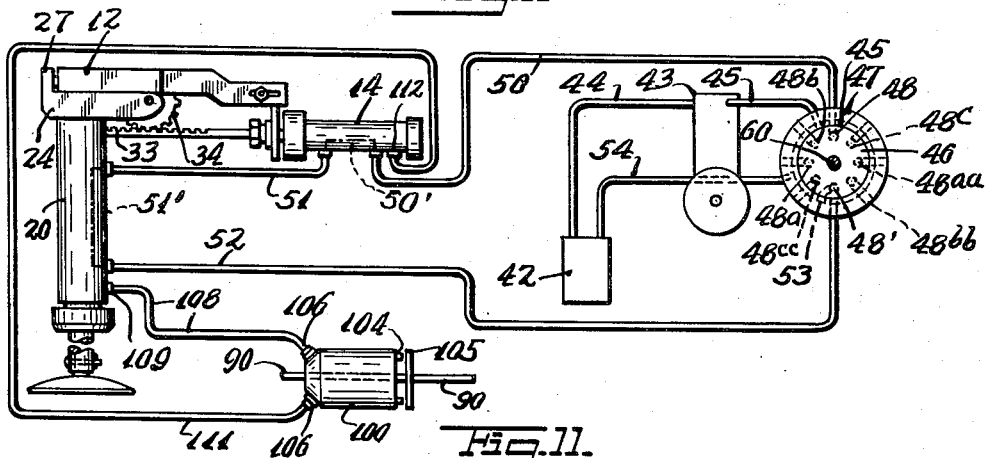
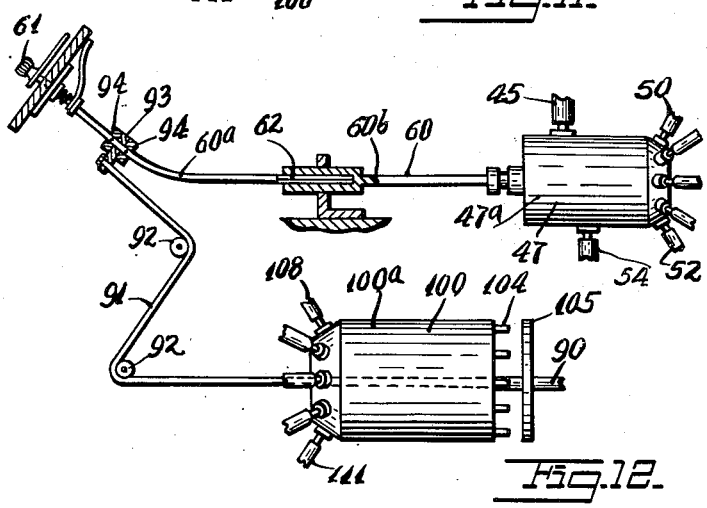
INVENTOR
*Anthony Skavinsky*
BY
ATTORNEY

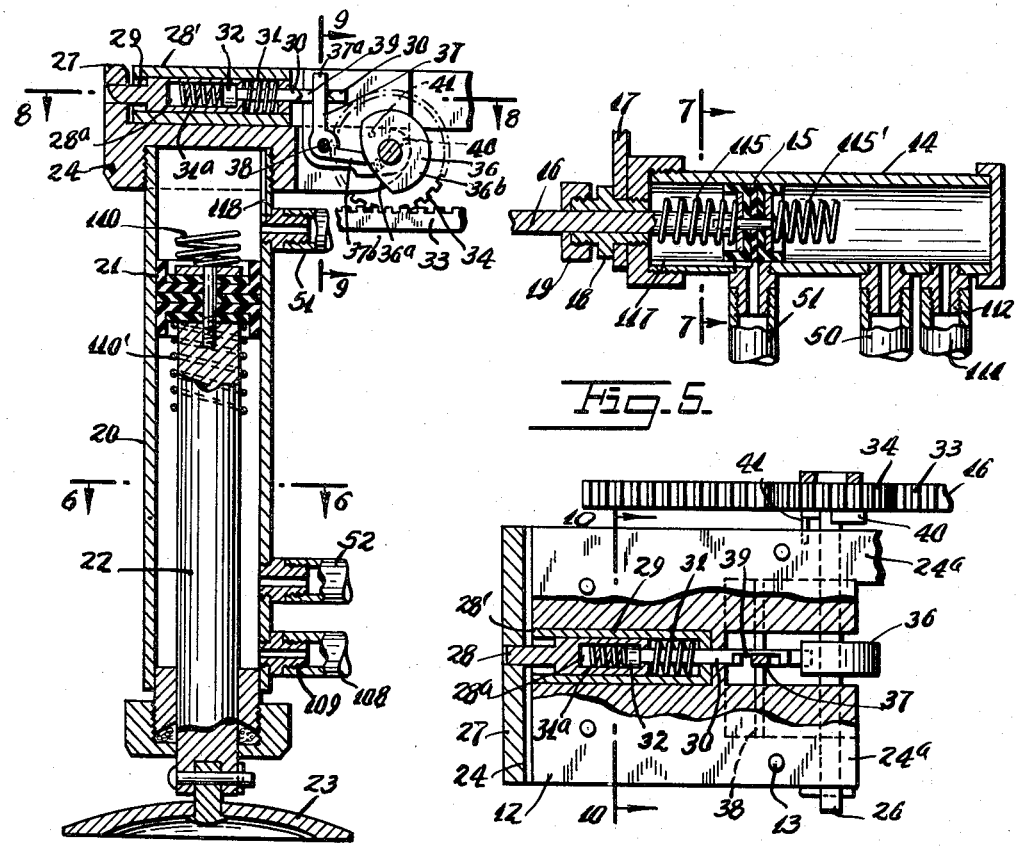

April 1, 1941.   A. SKAVINSKY   2,237,167
HYDRAULIC FLUID JACK FOR MOTOR VEHICLES
Filed Aug. 27, 1940   5 Sheets-Sheet 3
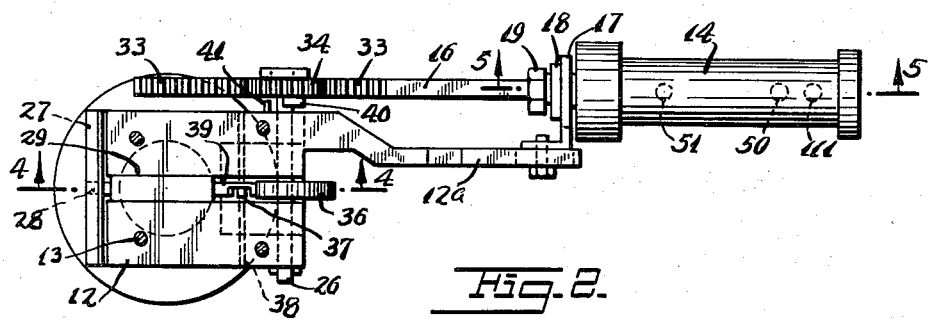
Fig. 2.
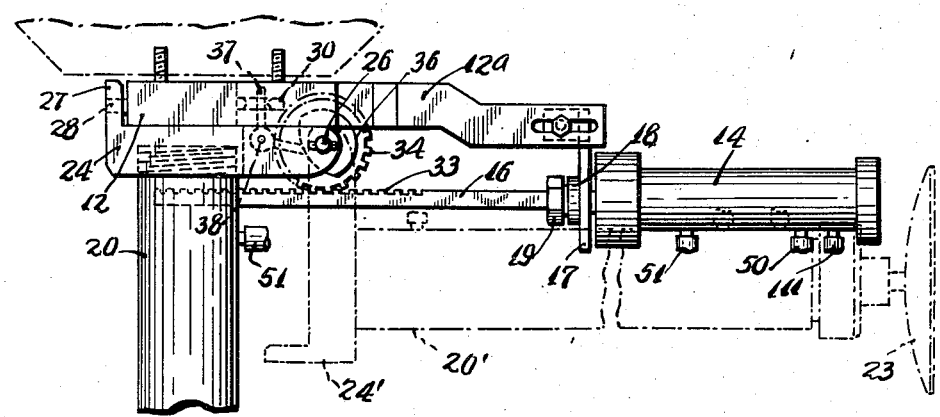
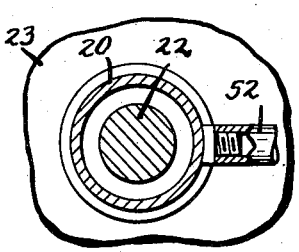
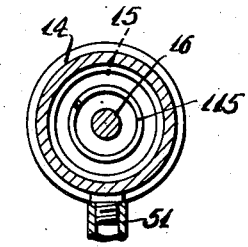
Fig. 3.   Fig. 6.   Fig. 7.
INVENTOR
*Anthony Skavinsky*
BY
ATTORNEY April 1, 1941. A. SKAVINSKY 2,237,167
HYDRAULIC FLUID JACK FOR MOTOR VEHICLES
Filed Aug. 27, 1940 5 Sheets-Sheet 4
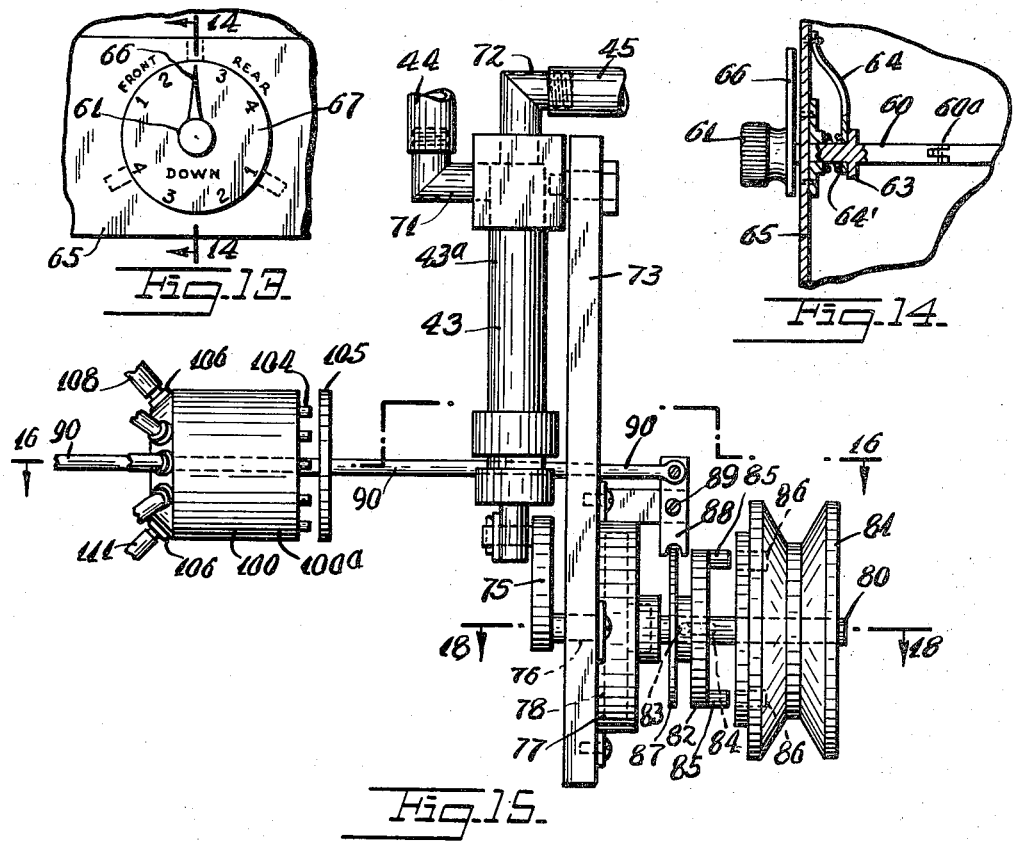
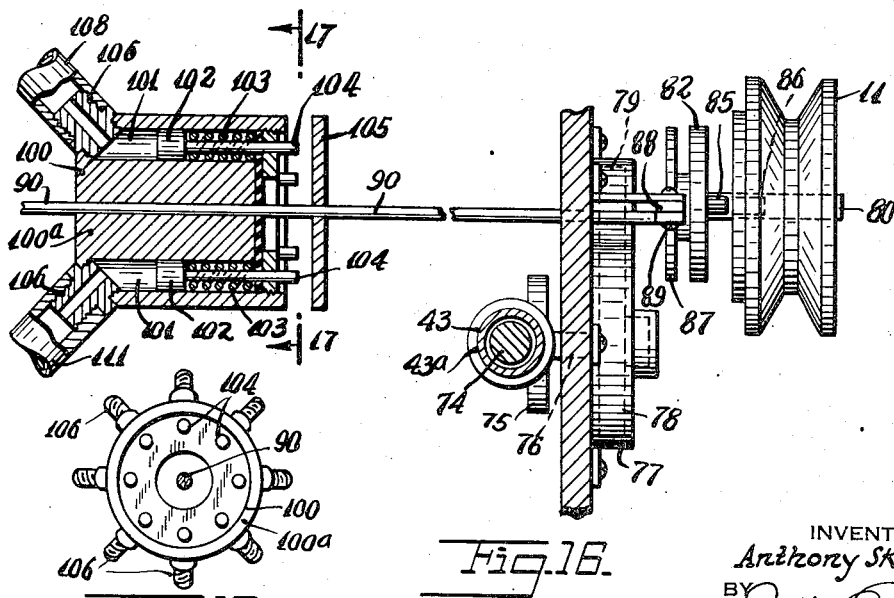
INVENTOR
Anthony Skavinsky
ATTORNEY

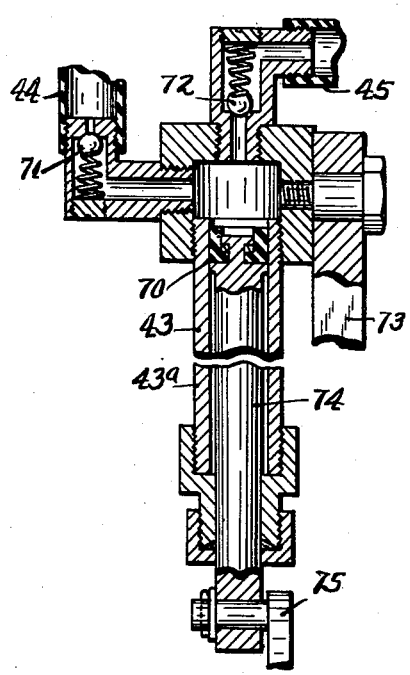
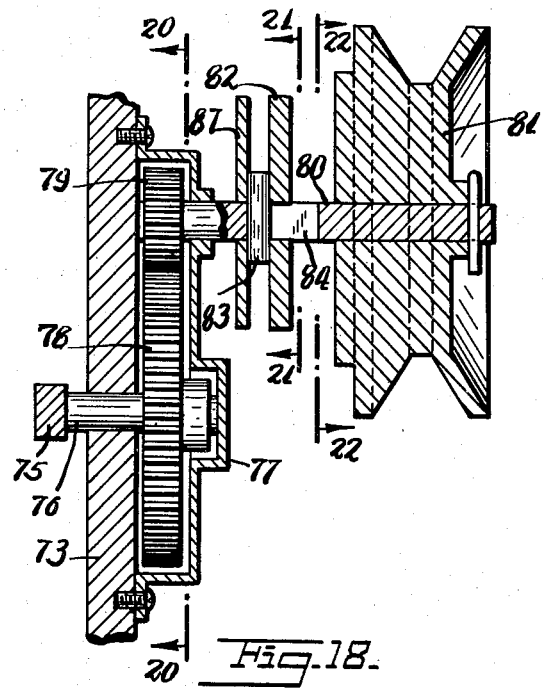
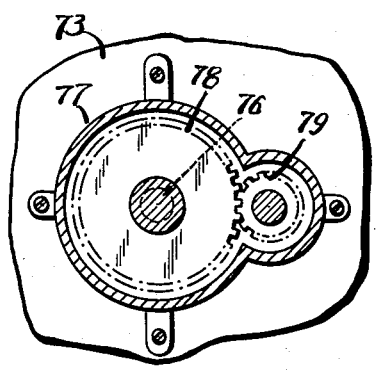
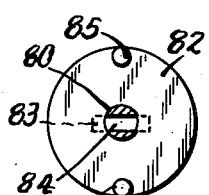
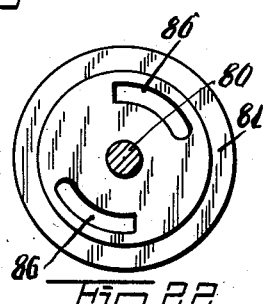
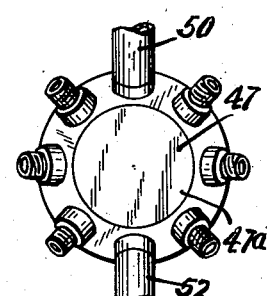
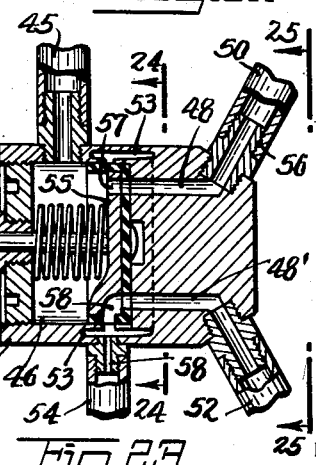
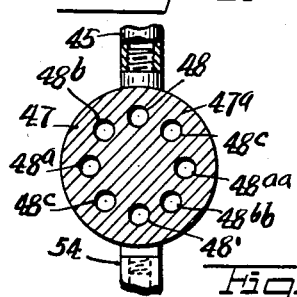
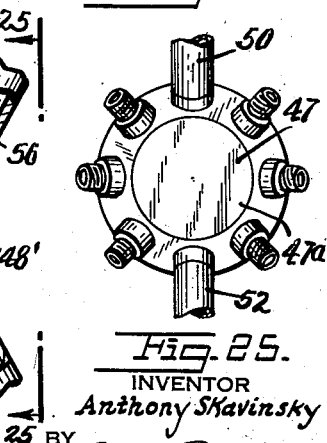

Patented Apr. 1, 1941

2,237,167

UNITED STATES PATENT OFFICE 2,237,167

HYDRAULIC FLUID JACK FOR MOTOR VEHICLES

Anthony Skavinsky, Bronx, N. Y.

Application August 27, 1940, Serial No. 354,404

14 Claims. (Cl. 254—86)

This invention relates to new and useful improvements in a hydraulic fluid jack for motor vehicles.

The invention proposes the construction of a hydraulic fluid jack which is characterized by a supply of hydraulic fluid, a clutch operated pump for pumping said fluid through a fluid circuit to jack devices mounted adjacent the wheels of a vehicle.

Still further the invention contemplates to characterize each jack device proper by a bracket for attachment adjacent the wheel of a vehicle, a horizontal cylinder supported on said bracket and having a piston with a horizontal projecting piston rod, a vertical cylinder pivotally mounted on said bracket to pivot to a horizontal position and having a piston with a vertical projecting piston rod, means for locking said vertical cylinder in its vertical position, and means operable by the retraction of said horizontal piston rod for opening said locking means and moving the vertical cylinder to its horizontal position, and upon extension of the horizontal piston rod moving the cylinder back to its vertical position. The invention proposes to so arrange the fluid circuit as to supply said cylinders with fluid for extending said pistons when the fluid is driven in one direction through the circuit and for retracting the pistons when the fluid is driven in the other direction.

Still further the invention proposes a manually operable selector for controlling the direction of said fluid through said fluid circuit.

The invention also contemplates the provision of manual means for closing the clutch of a clutch operated pump for circulating said hydraulic fluid, and automatic means for opening said clutch to stop said pump when said pistons are in their fully extended or retracted positions.

Still further the invention proposes the construction of a hydraulic fluid jack for vehicles as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of the chassis of a motor vehicle provided with a hydraulic fluid jack constructed in accordance with this invention, disclosing particularly the jack devices adjacent the wheels of the chassis, other portions of the jack are omitted from this view for clearness in illustrating the invention.

Fig. 2 is a plan view of one of the jack devices, per se.

Fig. 3 is a side elevational view of Fig. 2.

Fig. 4 is a fragmentary vertical sectional view taken on the line 4—4 of Fig. 2.

Fig. 5 is a fragmentary vertical sectional view taken on the line 5—5 of Fig. 2.

Fig. 6 is a horizontal sectional view taken on the line 6—6 of Fig. 4.

Fig. 7 is a vertical sectional view taken on the line 7—7 of Fig. 5.

Fig. 8 is a fragmentary horizontal sectional view taken on the line 8—8 of Fig. 4.

Fig. 9 is a fragmentary vertical sectional view taken on the line 9—9 of Fig. 4.

Fig. 10 is a fragmentary vertical sectional view taken on the line 10—10 of Fig. 8.

Fig. 11 is a schematic view showing the fluid circuit of one of the jack devices.

Fig. 12 is a schematic view of certain parts of the controlling mechanism for the fluid circuit shown in Fig. 11.

Fig. 13 is a fragmentary front elevational view of a portion of the dashboard of the vehicle with the control knob of the fluid circuit mounted thereon.

Fig. 14 is a fragmentary vertical sectional view taken on the line 14—14 of Fig. 13.

Fig. 15 is a side elevational view of certain parts of the mechanism of the device, particularly the clutch operated pump and a portion of the means for automatically declutching.

Fig. 16 is a fragmentary horizontal sectional view taken on the line 16—16 of Fig. 15.

Fig. 17 is a vertical sectional view taken on the line 17—17 of Fig. 16.

Fig. 18 is a fragmentary enlarged sectional view taken on the line 18—18 of Fig. 15.

Fig. 19 is a transverse vertical sectional view of the pump shown in Fig. 15.

Fig. 20 is a fragmentary reduced sectional view taken on the line 20—20 of Fig. 18.

Fig. 21 is a reduced vertical sectional view taken on the line 21—21 of Fig. 18.

Fig. 22 is a reduced sectional view taken on the line 22—22 of Fig. 18.

Fig. 23 is a longitudinal sectional view of the selector used in the device.

Fig. 24 is a sectional view taken on the line 24—24 of Fig. 23.

Fig. 25 is an elevational view looking in the direction of the line 25—25 of Fig. 23.

The hydraulic fluid jack for motor vehicles in accordance with this invention includes a jack device for each of the wheels 10 of a vehicle schematically shown in Fig. 1. The chassis 11 of said vehicle has been shown, having the wheels 10. A jack device has been illustrated as mounted upon the chassis adjacent each of the wheels thereof. Each of these jack devices includes a bracket 12 for attachment on the chassis adjacent the vehicle wheel. Each bracket 12 is provided with several fastening elements 13, such as screws, by which the bracket may be attached to a stationary portion of the chassis, preferably the brackets 12 should be attached to the axle or axle housing of the chassis.

A horizontal cylinder 14 is supported on each bracket 12 and has a piston 15 provided with a projecting horizontal piston rod 16. The bracket 12 has an extending portion 12ª supporting a small bracket 17 which connects with and supports the horizontal cylinder 14. More particularly the small bracket 17 encircles a bushing 18 which is mounted on an end of the cylinder 14. A packing gland 19 is mounted on the bushing 18 and encircles the piston rod 16.

A vertical cylinder 20 is pivotally mounted on the bracket 12 and is adapted to pivot to a horizontal position, as indicated by the dot and dash lines 20' in Fig. 3. This vertical cylinder is provided with a piston 21 having a vertical projecting piston rod 22. A disc shaped foot 23 is mounted upon the bottom end of the piston rod 22. The vertical cylinder 20 is pivotally mounted on the bracket 12 in the following way. There is an auxiliary bracket 24 which has a pair of side arms 24ª engaging the sides of a pair of lugs 12ᵇ projecting downwards from the bracket 12. A pintle 26 engages through the side arms 24ª and the lugs 12ᵇ for pivotally connecting these parts. The cylinder 20 is threadedly engaged into the auxiliary bracket 24.

The vertical cylinder 20 is adapted to be locked into its vertical position. This is accomplished in the following way. The auxiliary bracket 24 has an upwardly projecting keeper 27 which is engaged by a bolt 28 of a lock mechanism mounted on the bracket 12. The bolt 28 is slidably mounted in a casing 28' mounted in a recess 29 formed in the bracket 12. The bolt 28 has a stem 30 projecting from its rear end and extending into an area between the lug portions 12ᵇ. An expansion spring 31 is coaxially mounted on the stem 30 and acts to normally urge the bolt 28 forwards. The stem 30 is of separate material from the bolt and slidably engages into the rear of the bolt, and the inner end of the stem 30 is provided with a head 32. An expansion spring 31ª acts against this head 32 and the base of a recess 28ª formed in the bolt 28 and in which the head 32 slides, and acts to normally urge the stem 30 rearwards.

The device is also provided with means operable by the retraction of the horizontal piston 15 for opening the locking means described in the previous paragraph. This means is also adapted to move the vertical cylinder 20 to its horizontal position. This means is so constructed that upon extension of the horizontal piston rod 16 it will move the cylinder 20 back to its vertical position. More specifically the piston rod 16 is provided with a rack portion 33. This rack 33 meshes with pinion 34 fixedly mounted on the pintle 26. The arrangement is such that when the rack 16 moves it turns the pinion 34 which turns the pintle 26. A cam 36 is fixedly mounted on the pintle 26 and is cooperative with a bell crank 37 in a certain way.

The bell crank 37 is pivotally supported by a pintle 38 mounted between the lugs 12ᵇ. The bell crank 37 has a vertical arm 37ª extending upwards and engaging a cutout 39 formed in the stem 30. This cutout has sharp front and rear ends, see Fig. 4, so that when the bell crank 37 is pivoted the stem 30 will be moved. The bell crank 37 has a horizontal arm 37ᵇ which engages against the periphery of the cam 36. The cam 36 has a low side 36ª and a high side 36ᵇ. When the low side 36ª is adjacent the arm 37ᵇ, the bell crank 37 is free and the spring 31 holds the bolt 28 in its extended position. When the cam 36 is turned so that the high side 36ᵇ engages the arm 37ᵇ, the bell crank 37 will be pivoted so that the arm 37ª moves rearwards and drives the bolt 28 rearwards freeing it from the keeper 27 and thus opening the locking means.

The gear 34 has a projection 40 on one side which is coactable with a pin 41 mounted on the auxiliary bracket 24 eccentric of the pintle 26. The parts are so constructed and arranged that when the auxiliary bracket 24 is in its horizontal position, with the keeper 27 engaged by the bolt 28, then the projection 40 is slightly to the right of the pin 41. When the rack 33 moves towards the right, the pintle 26 will turn anti-clockwise. This will cause the cam 36 to operate the bell crank 37 to move the bolt 28 towards the right into its retracted position.

As soon as the bolt 28 reaches its retracted position the projection 40 will engage the pin 41 and then further motion of the rack 33 to the right will cause the auxiliary bracket 24 to pivot anti-clockwise about the pintle 26. This anti-clockwise movement will lift the vertical cylinder 20 to the horizontal position indicated by the dot and dash lines 20' in Fig. 3. The device is also provided with a supply for hydraulic fluid. This supply includes a tank 42 for containing the fluid. There is also a clutch operated pump 43 having an intake pipe 44 connected with the tank 42. The pump 43 has a discharge pipe 45 which is connected with the main chamber 46 of a selector device 47.

There is a fluid circuit from the supply tank 42 and the various cylinders of the various jack devices for extending the pistons thereof when the fluid thereon is driven in one direction and for retracting said pistons when the fluid thereof is driven in the other direction. The fluid circuit of one of the jacks is schematically illustrated in Fig. 11. Starting from the point 48 of the main chamber 46 of the selector device 47, the circuit extends through a pipe 50 to the rear end of the horizontal cylinder 14, then continues through the cylinder in a particular way, schematically indicated in Fig. 11 by the dot and dash lines 50', then continues through the pipe 51 to the top end of the cylinder 20, then continues through the cylinder 20 in a particular way schematically indicated by the dot and dash lines 51', then continues through the pipe 52 to the point 48' of the selector 47, then continues into the discharge chamber 53 of the selector 47 and then through the pipe 54 back to the tank 42. The circuit will be better understood by now carefully studying the construction of the selector 47.

The selector 47 includes a selector body 47ª, having the main chamber 46 in which there is a rotative disc valve 55. This valve 55 controls eight passages indicated by reference numeral 48 and its derivatives. Four of these passages are intended for controlling the extension of the four jacks illustrated in Fig. 1, and the other four passages for controlling the retraction of the four jacks, illustrated in Fig. 1. Two of these passages are schematically indicated in Fig. 11 for the points 48 and 48'. The eight passages extend longitudinally through the body 47ª and connect with pipe nipples 56 intended for the various pipes for the fluid circuit.

The disc valve 55 has one opening 57 completely through it, extending from one side to the other. When this opening 57 aligns with any of the eight passages in the body 47ª, the fluid circuit of the particular passage will be connected with the main chamber 46. The valve 55 also is provided with a right angle passage 58 which is adapted to be selectively connected with one of the said eight passages to connect same with the discharge chamber 53. The discharge chamber 53 is in the form of a hollow extended completely around within the selector body 47ª. This discharge chamber 53 has one nipple 58 for the pipe 54 which connects with the tank 42.

Four of the eight passages in the body 47ª are indicated by reference numerals 48ª, 48ᵇ, 48, and 48ᶜ. The other four passages are indicated by reference numerals 48ᵃᵃ, 48ᵇᵇ, 48' and 48ᶜᶜ. The passages 48 and 48' are diametrically opposite each other and the other passages of like reference numerals are also diametrically opposite each other. The disc valve 55 is controlled by a cable 60 which extends to the dashboard of the automobile and connects with a control knob 61. The cable 60 is made from two sections telescopically connected with each other. There is a front section 60ª directly connected with the knob 60, and there is a rear section 60ᵇ which is directly connected with the disc valve 55. The sections 60ª and 60ᵇ are connected with each other by a slidable coupling 62. The arrangement is such that the knob 61 may be turned for turning the cable 60, and furthermore, the knob 61 may be pulled out and in its extended position may be turned for turning the cable 60.

The knob 61 may be pulled outwards a limited distance as controlled by a flange 63 mounted on the cable section 60ª. A spring 64 is mounted on the dashboard 65 and acts against the flange 63 for urging the knob 61 inwards. Another spring 64' also acts against the flange 63 for assisting in urging the cable section 60ª inwards. A pointer 66 is connected with the knob 61 extending radially thereof over a scale 67 arranged on the front of the dashboard 65. This scale bears the front legend "front" adjacent top numbers one and two and "rear" adjacent top numbers three and four, and "down" adjacent complementary bottom numbers 1, 2, 3 and 4. The arrangement is such that when the knob 61 is turned to stop the pointer 66 on any one of the numbers, the cable 60 will be correspondingly turned and correspondingly will turn the disc valve 55, to set the valve passage 57 over one of the eight passages in the body 47ª and to have the passage 58 connect with another one of the eight passages connecting it with the discharge chamber 53. It will thus be comprehended that the fluid circuit may be connected with any one of the four jack devices so as to cause the fluid to flow in one direction, or the other direction, to extend or retract any particular jack device.

The pump 43 is characterized by a pump body 43ª in which there is a piston 70. The top of the pump body 43ª, this body comprising the cylinder of the pump, is provided with an intake valve 71 and a discharge valve 72. The pipe 44 from the tank 42 connects with the intake valve 71. The pipe 45 connects with the discharge valve 72. The body 43ª of the pump is supported by a standard 73. The piston 70 is provided with a piston rod which extends out from the bottom end of the body 43ª.

The piston rod 74 connects with a crank 75. This crank is mounted on a shaft 76 of a speed reduction unit 77. This speed reduction unit 77 includes a large gear 78 mounted on the shaft 76 and meshing with a small gear 79 mounted on a shaft 80. The shaft 80 supports a freely mounted drive wheel 81. This drive wheel 81 is free on the shaft. A clutch 82 is keyed on to the shaft 80 in a way so that it may move longitudinally. The clutch 82 includes a pin 83 passing through a longitudinal extending slot 84 in the shaft 80. The clutch 82 is provided with several projecting pins 85 which are adapted to engage in openings 86 formed in the side of the driver pulley 81. The clutch 82 is provided with a flange 87 engaged by a lever 88. This lever is pivotally mounted at its center by a pin 89. The other end of the lever 88 connects with an operator rod 90. The arrangement is such that when the operator rod 90 is moved towards the left the clutch 82 will be closed so that rotations from the driver pulley 81 will be transmitted to rotate the crank 75, and operate the pump 43.

The operator rod 90 connects with a cable 91 which is engaged over guiding elements 92 and which connects with an arm 93 rotatively but non-slidably mounted on the cable section 60ª. More specifically the arm 90 has an opening through which the cable 60ª passes. Flanges 94 are mounted on the cable 60ª on opposite sides of the arm 93. The arrangement is such that when the knob 61 is pulled out the cable 91 will move which in turn moves the operator rod 90 to close the clutch 82.

The device is also provided with means for opening the clutch 82 automatically to stop the pump 43 when the pistons of the cylinders 14 and 20 of any one of the four jack devices reach their fully extended or retracted positions. This means includes a shut-off device 100. The shut-off device 100 comprises a body 100ª having eight longitudinally extending chambers 101. A piston 102 is slidably mounted in each chamber 101. A spring 103 urges each piston inwards. Each piston has a stem 104 which extends from one end of the body 100ª. These stems 104 are adapted to strike against a flange 105 mounted on the operator rod 90. Each of the eight chambers 101 has a pipe nipple 106. These pipe nipples are intended to be connected in a certain way with the cylinders 14 and 20. More specifically diametrically opposite pairs of the eight chambers 101 are selectively connected to each pair of cylinders 14 and 20 of each jack device.

A pipe 108 is connected with one of the pipe bushings 106 and connects with a pipe bushing 109 at the extreme bottom of the cylinder 20. This bushing 109 is below the point where the pipe 52 connects with the cylinder 20. The piston 21 has springs 110 and 110' mounted on opposite sides. The arrangement is such that when the piston 21 moves outwards in the cylinder 20, a time comes when the piston 21 cuts off the pipe 52. Then hydraulic fluid is entrapped in the cylinder 20 below the pipe 52. This entrapped fluid is forced out through the nipple 109 into the pipe 108 to the nipple 106, and the fluid enters the chamber 101 moving the piston 102 and forcing out the stem 104 which engages the flange 105 moving the operator rod 90 towards the right.

The other of the pair of diametrically opposite bushings 106 is connected by a pipe 111 to a bushing 112 which is slightly rearwards of the point on the cylinder 14 to which the pipe 50 connects. The piston 15 is also provided with springs 115 and 115' on opposite ends thereof. When the piston 15 moves towards the right a time will come when it cuts off the fluid from the pipe 50 and entraps the fluid in the right hand end of the cylinder 14, forcing this fluid out through the nipple 112 into the pipe 111 to the nipple 106 and the chamber 101 and so indirectly causes the flange 105 to be moved again for moving the operator rod 90 towards the right.

The cylinder 14 has a small by-pass 117 at its left hand end so that the piston 15 may pass the point at which the pipe 51 is connected with the left hand end of the cylinder. Similarly the cylinder 20 has a by-pass cut 118 which permits the piston 21 to pass the point at which the pipe 51 connects with the top of this cylinder.

The operation of the device may best be understood by assuming one of the jack devices is in its fully extended position as schematically illustrated in Fig. 11. Figs. 4 and 5 show the jack device nearly fully extended—it would be fully extended if the piston rod 22 were in its fully extended position. The valve 72 of the pump 43 holds the jack device fully extended. This may be understood by tracing the fluid circuit. The weight of the vehicle rests on the foot 23 which is connected with the piston rod 22 so that there is a tendency for the piston 21 to move upwards and force back the hydraulic fluid.

When the jack is fully extended and the pump 43 is inoperative and not exerting a pressure, the bottom edge of the piston 21 will be slightly above the pipe 52. There is therefore the tendency for the hydraulic fluid above the piston 21 to be forced upwards through the pipe 51 and into the cylinder 14. In this cylinder the tendency is for the piston 15 to be forced to the right forcing the hydraulic fluid into the pipes 50 and 111. The spring 103 in the chamber 101 of the clutch shut-off device 100 has sufficient resistance to hold the piston 102 towards the left immovable against this back pressure. The fluid which tends to enter the pipe 50 will communicate with the chamber 46, the pipe 45 and the valve 72. This back pressure tends to close the valve 72 and so the jack is maintained in its fully extended positions.

When it is desired to retract the jack it is necessary that the knob 61 be turned to turn the cable 60 so that the disc valve 55 turns through 180° and then the opening 57 will have moved from the point 48, see Fig. 11 to the point 48'. At the same time the opening 58 will have moved from the point 48' to the point 48. It is an easy matter to turn the knob 61 the correct amount by watching the pointer 66 which is attached on the knob, and which indicates upon the scale 67. The knob 61 must now be pulled outwards which will pull the cable section 60ᵃ outwards and pull the cable 91. This moves the operator rod 90 towards the left which pivots the lever 88, and forces the clutch 82 into operative position connecting with the driver pulley 81.

The driver pulley 81 is being continuously driven, preferably by a belt, not shown on the drawings, which connects with the fan of the automobile engine. Then the knob 61 is released and the springs 64 and 64' will move the cable section 60ᵃ back to its original position. However, this does not effect the cable 91. The operator rod 90 retains its position towards the left. Rotations from the driver pulley 81 are now transmitted to drive the pump 43. The fluid will be drawn from the tank 42 through the pipe 44, by the pump 43 and discharged into the pipe 45. From this pipe 45 it enters the chamber 46 passes through the valve opening 57, and into the pipe 52. The spring 110' tends to maintain the piston 21 in an elevation slightly above the pipe 52 when there is no back pressure exerted by pumps 43. The fluid enters beneath the piston 21 forcing the piston upwards.

The slight rise in pressure beneath the piston 21, at this time due to the action of pump 43, passes into the pipe 108 but it will not influence the piston 102 in the chamber 101 because the spring 103 is strong enough to hold the piston 102 stationary against this pressure. The piston 21 will move upwards thus retracting the jack and lowering the vehicle until the piston 21 passes the pipe 51. Then the fluid passes through the pipe 51 to the cylinder 14. Because of the by-pass 117 and the spring 115 the fluid will get to the left hand side of the piston 15 forcing the piston to the right.

As the piston 15 moves slightly to the right the piston rod 16 will move correspondingly causing the rack 33 to slightly turn the gear 34. This indirectly turns the cam 36 anti-clockwise, as viewed in Fig. 4. The high part 36ᵇ of the cam, pivots the bell crank 37 causing it to retract the bolt 28. This frees the auxiliary bracket 24. Upon further motion to the right of the piston 15, the piston rod 16 will move accordingly turning the gear 34 a further amount and then the projection 40 engages the pin 41 pivoting the auxiliary bracket 24 anti-clockwise. This continues until the auxiliary bracket 24 reaches the position indicated by the dot and dash lines 24' in Fig. 3. At this point the cylinder 20 will be in the horizontal position indicated by the dot and dash lines 20' in Fig. 3.

When the cylinder 20 reaches the horizontal position 20' the piston 15 will have reached the point in which the right hand edge of the piston 15 passes over the nipple of the pipe 50. This entraps the fluid in the right hand end of the cylinder 14. The pressure of this entrapped fluid builds up through the pipe 111 until it is sufficiently strong to move the piston 102 against the holding action of spring 103 of the clutch shut-off device 100. The stem 104 now moves towards the right, striking and moving the flange 105 towards the right which in turn moves the operator rod 90. This causes the lever 88 to pivot so that the clutch 82 is moved towards the left. This disconnects the pump 43 and the jack is now in its fully inoperative positions.

The jack may be lowered by turning the knob 61, or the knob 61 may be placed in a position to lower any one of the four jacks illustrated in Fig. 1. In a similar manner after any one of these jacks has been lowered it may be raised by turning the knob 61 to the number on the scale 67 indicating the raising of the particular jack.

It is to be understood that the pipe 111 may be eliminated and the bushing 106 may be connected to any part along the pipe 52 to obtain the same result.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means for locking said vertical cylinder in its vertical position, means operable by the retraction of said horizontal piston rod for unlocking said locking means and for moving the vertical cylinder to its horizontal position and upon extension of the horizontal piston rod moving the cylinder back to its vertical position and, a supply of hydraulic fluid from and to said horizontal cylinder for extending or retracting its respective piston rod.

2. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means for locking said vertical cylinder in its vertical position, means operable by the retraction of said horizontal piston rod for unlocking said locking means and for moving the vertical cylinder to its horizontal position and upon extension of the horizontal piston rod moving the cylinder back to its vertical position and, a supply of hydraulic fluid from and to said horizontal cylinder for extending or retracting its respective piston rod, said bracket being provided with an auxiliary bracket supporting said horizontal cylinder.

3. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means for locking said vertical cylinder in its vertical position, means operable by the retraction of said horizontal piston rod for unlocking said locking means and for moving the vertical cylinder to its horizontal position and upon extension of the horizontal piston rod moving the cylinder back to its vertical position and, a supply of hydraulic fluid from and to said horizontal cylinder for extending or retracting its respective piston rod, the pivotal mounting of said vertical cylinder being accomplished with an auxiliary bracket mounted on said bracket and said vertical cylinder being mounted on said auxiliary bracket.

4. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means for locking said vertical cylinder in its vertical position, means operable by the retraction of said horizontal piston rod for unlocking said locking means and for moving the vertical cylinder to its horizontal position and upon extension of the horizontal piston rod moving the cylinder back to its vertical position and, a supply of hydraulic fluid from and to said horizontal cylinder for extending or retracting its respective piston rod, the pivotal mounting of said vertical cylinder being accomplished with an auxiliary bracket mounted on said bracket and said vertical cylinder being mounted on said auxiliary bracket, said means for locking said vertical cylinder in its vertical position including a bolt device engageable with a keeper mounted on said auxiliary bracket.

5. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means for locking said vertical cylinder in its vertical position, means operable by the retraction of said horizontal piston rod for unlocking said locking means and for moving the vertical cylinder to its horizontal position and upon extension of the horizontal piston rod moving the cylinder back to its vertical position and, a supply of hydraulic fluid from and to said horizontal cylinder for extending or retracting its respective piston rod, the pivotal mounting of said vertical cylinder being accomplished with an auxiliary bracket mounted on said bracket and said vertical cylinder being mounted on said auxiliary bracket, said means for locking said vertical cylinder in its vertical position including a bolt device engageable with a keeper mounted on said auxiliary bracket, said bolt device including resilient means urging said bolt into its extended position.

6. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means for locking said vertical cylinder in its vertical position, means operable by the retraction of said horizontal piston rod for unlocking said locking means and for moving the vertical cylinder to its horizontal position and upon extension of the horizontal piston rod moving the cylinder back to its vertical position and, a supply of hydraulic fluid from and to said horizontal cylinder for extending or retracting its respective piston rod, the pivotal mounting of said vertical cylinder being accomplished with an auxiliary bracket mounted on said bracket and said vertical cylinder being mounted on said auxiliary bracket, said means for locking said vertical cylinder in its vertical position including a bolt device engageable with a keeper mounted on said auxiliary bracket, said bolt device including resilient means urging said bolt into its extended position, said bolt being provided with a stem having a notch, and a pivoted bell crank having one of its arms engaging said notch, whereby the bell crank may be pivoted to retract the bolt.

7. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means for locking said vertical cylinder in its vertical position, means operable by the retraction of said horizontal piston rod for unlocking said locking means and for moving the vertical cylinder to its horizontal position and upon extension of the horizontal piston rod moving the cylinder back to its vertical position and, a supply of hydraulic fluid from and to said horizontal cylinder for extending or retracting its respective piston rod, the pivotal mounting of said vertical cylinder being accomplished with an auxiliary bracket mounted on said bracket and said vertical cylinder being mounted on said auxiliary bracket, said means for locking said vertical cylinder in its vertical position including a bolt device engageable with a keeper mounted on said auxiliary bracket, said bolt device including resilient means urging said bolt into its extended position, said bolt being provided with a stem having a notch, and a pivoted bell crank having one of its arms engaging said notch, whereby the bell crank may be pivoted to retract the bolt, said means operable by the retraction of said horizontal piston including a rack connected with the piston thereof, and meshing with a gear connected with a cam cooperative with said bell crank to pivot the bell crank for retracting the bolt.

8. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means for locking said vertical cylinder in its vertical position, means operable by the retraction of said horizontal piston rod for unlocking said locking means and for moving the vertical cylinder to its horizontal position and upon extension of the horizontal piston rod moving the cylinder back to its vertical position and, a supply of hydraulic fluid from and to said horizontal cylinder for extending or retracting its respective piston rod, the pivotal mounting of said vertical cylinder being accomplished with an auxiliary bracket mounted on said bracket and said vertical cylinder being mounted on said auxiliary bracket, said means for locking said vertical cylinder in its vertical position including a bolt device engageable with a keeper mounted on said auxiliary bracket, said bolt device including resilient means urging said bolt into its extended position, said bolt being provided with a stem having a notch, and a pivoted bell crank having one of its arms engaging said notch, whereby the bell crank may be pivoted to retract the bolt, said means operable by the retraction of said horizontal piston including a rack connected with the piston thereof, and meshing with a gear connected with a cam cooperative with said bell crank to pivot the bell crank for retracting the bolt, said gear being fixedly mounted on a pintle comprising a pivot of said auxiliary bracket on said bracket.

9. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means for locking said vertical cylinder in its vertical position, means operable by the retraction of said horizontal piston rod for unlocking said locking means and for moving the vertical cylinder to its horizontal position and upon extension of the horizontal piston rod moving the cylinder back to its vertical position and, a supply of hydraulic fluid from and to said horizontal cylinder for extending or retracting its respective piston rod, the pivotal mounting of said vertical cylinder being accomplished with an auxiliary bracket mounted on said bracket and said vertical cylinder being mounted on said auxiliary bracket, said means for locking said vertical cylinder in its vertical position including a bolt device engageable with a keeper mounted on said auxiliary bracket, said bolt device including resilient means urging said bolt into its extended position, said bolt being provided with a stem having a notch, and pivoted bell crank having one of its arms engaging said notch, whereby the bell crank may be pivoted to retract the bolt, said means operable by the retraction of said horizontal piston including a rack connected with the piston thereof, and meshing with a gear connected with a cam cooperative with said bell crank to pivot the bell crank for retracting the bolt, said gear being fixedly mounted on a pintle comprising a pivot of said auxiliary bracket on said bracket, and a projection on said gear cooperative with a pin eccentrically mounted on said auxiliary bracket by which the auxiliary bracket may be moved to place the vertical cylinder in its horizontal position.

10. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means operable by the retraction of said horizontal piston rod for moving the vertical cylinder to its horizontal position and upon extension of the horizontal piston rod moving the cylinder back to its vertical position, a supply of hydraulic fluid from and to said cylinders, a fluid circuit for extending said pistons when fluid thereof is driven in one direction and retracting said pistons when the fluid thereof is driven in the other direction, a manually operable selector for controlling the direction of said fluid, a clutch operated pump for circulating said fluid through said fluid circuit, manual means for closing said clutch, and means for opening said clutch to stop said pump when said pistons are in their fully extended or retracted positions, said fluid circuit including certain pipe lines between said cylinders and the said manually operable selector.

11. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means operable by the retraction of said horizontal piston rod for moving the vertical cylinder to its horizontal position and upon extension of the horizontal piston rod moving the cylinder back to its vertical position, a supply of hydraulic fluid from and to said cylinders, a fluid circuit for extending said pistons when fluid thereof is driven in one direction and retracting said pistons when the fluid thereof is driven in the other direction, a manually operable selector for controlling the direction of said fluid, a clutch operated pump for circulating said fluid through said fluid circuit, manual means for closing said clutch, and means for opening said clutch to stop said pump when said pistons are in their fully extended or retracted positions, said manually operable selector comprising a body having a main chamber for the supply of hydraulic fluid from said pump, and a valve controlling the passage of fluid from said main chamber to one of a series of passages, said passages being connected up with said fluid circuit substantially as described.

12. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means operable by the retraction of said horizontal piston rod for moving the vertical cylinder to its horizontal position and upon extension of the horizontal piston rod moving the cylinder back to its vertical position, a supply of hydraulic fluid from and to said cylinders, a fluid circuit for extending said pistons when fluid thereof is driven in one direction and retracting said pistons when the fluid thereof is driven in the other direction, a manually operable selector for controlling the direction of said fluid, a clutch operated pump for circulating said fluid through said fluid circuit, manual means for closing said clutch, and means for opening said clutch to stop said pump when said pistons are in their fully extended or retracted positions, said clutch operated pump including a drive pulley, a clutch adapted to connect therewith, a pump mechanism, means for opening up said clutch and controlled with an operator rod, and said operator rod being connected with said manual means for closing said clutch.

13. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means operable by the retraction of said horizontal piston rod for moving the vertical cylinder to its horizontal position and upon extension of the horizontal piston rod moving the cylinder back to its vertical position, a supply of hydraulic fluid from and to said cylinders, a fluid circuit for extending said pistons when fluid thereof is driven in one direction and retracting said pistons when the fluid thereof is driven in the other direction, a manually operable selector for controlling the direction of said fluid, a clutch operated pump for circulating said fluid through said fluid circuit, manual means for closing said clutch, and means for opening said clutch to stop said pump when said pistons are in their fully extended or retracted positions, said clutch operated pump including a drive pulley, a clutch adapted to connect therewith, a pump mechanism, means for opening up said clutch and controlled with an operator rod, and said operator rod being connected with said manual means for closing said clutch, said means for opening said clutch including a body having a plurality of passages with pistons mounted therein, springs urging said pistons in one direction, a fluid circuit connected with the other ends of said passages and with the extremities of said cylinders, means for trapping fluid in the extremities of said cylinders for building up a pressure to move said last-mentioned pistons, stems connecting with the latter mentioned pistons and engageable with a flange mounted on said operator rod.

14. In a hydraulic fluid jack for motor vehicles, a bracket for attachment adjacent the wheel of a vehicle, a horizontal cylinder supported on said bracket and having a piston with a horizontally projecting piston rod, a vertical cylinder pivotally mounted in said bracket and adapted to pivot to a horizontal position and having a piston with a vertically projecting piston rod, means operable by the retraction of said horizontal piston rod for moving the vertical cylinder to its horizontal position and upon extension of the horizontal piston rod moving the cylinder back to its vertical position, a supply of hydraulic fluid from and to said cylinders, a fluid circuit for extending said pistons when fluid thereof is driven in one direction and retracting said pistons when the fluid thereof is driven in the other direction, a manually operable selector for controlling the direction of said fluid, a clutch operated pump for circulating said fluid through said fluid circuit, manual means for closing said clutch, and means for opening said clutch to stop said pump when said pistons are in their fully extended or retracted positions, said clutch operated pump including a drive pulley, a clutch adapted to connect therewith, a pump mechanism, means for opening said clutch and controlled with an operator rod, and said operator rod being connected with said manual means for closing said clutch, said means for opening said clutch including a body having a plurality of passages with pistons mounted therein, springs urging said pistons in one direction, a fluid circuit connected with the other ends of said passages and with the extremities of said cylinders, means for trapping fluid in the extremities of said cylinders for building up a pressure to move said last-mentioned pistons, stems connecting with the latter mentioned pistons and engageable with a flange mounted on said operator rod, said operator rod being connected with a cable associated with a manual controllable knob included in said means for closing said clutch.

ANTHONY SKAVINSKY.